United States Patent [19]

Garg et al.

[11] Patent Number: 5,641,469

[45] Date of Patent: Jun. 24, 1997

[54] PRODUCTION OF ALPHA ALUMINA

[75] Inventors: Ajay K. Garg, Northborough; Edward Lilley, Shrewsbury, both of Mass.

[73] Assignee: Norton Company, Worcester, Mass.

[21] Appl. No.: 705,999

[22] Filed: May 28, 1991

[51] Int. Cl.$^6$ .............. C01F 7/02; C04B 35/10; B24D 3/14; C09K 3/14
[52] U.S. Cl. .............. 423/625; 51/309; 501/153
[58] Field of Search .............. 423/DIG. 15, 659, 423/625, 629, 628, 626; 23/293 R; 51/309; 501/12, 153

[56] References Cited

U.S. PATENT DOCUMENTS

| | | | |
|---|---|---|---|
| 4,019,914 | 4/1977 | Esper et al. | 423/625 |
| 4,623,364 | 11/1986 | Cottringer et al. | 51/309 |
| 4,744,802 | 5/1988 | Schwabel | 51/309 |
| 4,797,139 | 1/1989 | Bauer | 51/309 |
| 4,835,124 | 5/1989 | Pearson | 501/127 |
| 5,034,360 | 7/1991 | Bartels et al. | 501/153 |

FOREIGN PATENT DOCUMENTS

| | | | |
|---|---|---|---|
| 168606 | 1/1986 | European Pat. Off. | 423/626 |
| 55-113615 | 9/1980 | Japan | 423/625 |
| 61-106413 | 5/1986 | Japan | 423/625 |

OTHER PUBLICATIONS

Bauer, R.; U.S. Statutory Invention Registration H189 Published Jan. 6, 1987.

Kumagai, M. et al. "Enhanced Densification of Boehmite Sol–Gels by Alpha–Alumina Seeding", Communications of the Am. Ceramic Soc., Nov. 1984, pp. 230–231.

Tsuchida, T., et al. "Mechanochemical Phenomena of Gibbsite, Bayerite and Boehmite by Grinding"; Chem. Abs., vol. 111, #244740 (Dec. 25, 1989).

Thermochimica Acta, 148 (1989) 301–310 Israel J. Lin, Shmuel Nadiv and Ptahia Bar–on.

C. R. Acad. Sc. Paris, T. 271 Serie D – 153–155, 945–948 and 1057–1059.

Journal of the American Ceramic Society, vol. 65, No. 9, 442–448 F. W. Dynys and J. W. Halloran.

*Primary Examiner*—Gary P. Straub
*Assistant Examiner*—Peter T. DiMauro
*Attorney, Agent, or Firm*—David Bennett

[57] ABSTRACT

Dry milling an alpha alumina precursor produces direct conversion to alpha alumina at room temperature.

5 Claims, 1 Drawing Sheet

PRODUCTION OF ALPHA ALUMINA

BACKGROUND OF THE INVENTION

This invention relates to a process for the production of alpha alumina and more specifically to a process for the production of alpha alumina from a precursor using a dry process.

Alumina is one of the most important and widely used abrasive materials. Some years ago the industry standard was artificially produced corundum, or alpha alumina, made by a thermal process in which bauxite was converted to the oxide. After the invention of the sol gel process in which a sol of boehmite was gelled, dried and then fired to convert to alpha, it was realized that the finer the crystal size in the abrasive grains, the better the abrasive performed. This led to the seeded sol gel process of Cottringer et al. (U.S. Pat. No. 4,623,364), which produces sub-micron sized crystallites by introducing sub-micron sized seed particles of alpha alumina or equivalent seed material into a boehmite sol which is then gelled, dried and fired as before. This was found also to decrease the temperature at which conversion to alpha alumina occurs. However sol-gel processes all have the disadvantage that it is necessary to use large volumes of water which have to be heated, transported and eventually removed at some time during the process. Elimination or reduction of this water could, in some situations, be very desirable.

It has been recognized for some time that an alpha alumina precursor, such as gamma alumina, can be induced to undergo conversion to the alpha phase at a comparatively low temperature under the influence of a dry milling operation. This effect is described in a paper by Lin, Nadiv and Baron, (Thermochimica Acta, 148 (1989), pp. 301–310, which describes milling gamma alumina at room temperature and thereafter heating to 800° C. to convert to alpha alumina. The conversion to alpha alumina was measured using X-ray diffraction techniques. It was found that the longer the gamma alumina had been milled, the greater the proportion of the gamma was converted to alpha even at this temperature, which is some 400° C. below the normal conversion temperature.

In addition, Panis, in a series of articles in C.R. Acad. Sc. Paris, vol. 271, No. 13, Series D, pages 153–155, 945–948 and 1057–1059, disclosed that, after dry grinding at elevated temperatures at atmospheric pressure, both gamma alumina and boehmite could be transformed essentially completely into alpha alumina if the grinding were continued long enough. In addition it was found that grinding reduced the conversion temperature to alpha alumina. It is not however practical to grind in volume at such temperatures so that these findings have not roused much commercial interest. Panis also taught that boehmite can be dry milled at room temperature to reduce the temperature at which it transforms to the alpha form.

It has been speculated, for example by Dynys and Halloran, (J. Amer. Ceram. Soc. Vol. 65, No. 9 pp 442–448), that the dry milling causes a mechanochemical transformation, that is, a chemical transformation induced in a dry material by the application of mechanical forces, and is similar to other reported accelerations of phase transformation by mechanical action during milling.

It has now been found possible to obtain a significant conversion of boehmite or gamma alumina to alpha alumina in a room temperature operation by operating under specific conditions. This offers the opportunity of a very attractive route to alpha alumina, perhaps starting from the readily available and sol-gel processable boehmite, that has great flexibility of application and potential for significant savings.

The present invention also provides a process that significantly reduces the temperature of thermal conversion, (as measured by differential thermal analysis), of an alpha alumina precursor to alpha alumina. It also provides a process for treating an alpha alumina precursor to yield a product that would sinter to alpha alumina with at least 97% of theoretical density, at a temperature that is at least 50° C. below the sintering temperature of the untreated precursor.

DESCRIPTION OF THE INVENTION

The process of the invention comprises inducing a mechanochemical conversion of an alpha alumina precursor to alpha alumina, in the substantial absence of water, in a milling device maintained at a temperature below 100° C.

It is found that this process is significantly accelerated by the presence of at least about 0.1% by weight of sub-micron sized seed particles effective to promote conversion of the precursor to alpha alumina.

When a precursor is described as "seeded" it is meant that the precursor has uniformly dispersed within it at least about 0.1% by weight of sub-micron sized seed particles effective to promote the conversion of the precursor to alpha alumina.

In order to be effective, the seed particles must be completely and essentially uniformly dispersed in the precursor. Such dispersions are well known as intermediates in the sol-gel process for the production of alpha alumina such as are described in U.S. Pat. Nos. 4,623,364; 4,744,802; 4,964,883; and 4,954,462. In these processes the seed particles are dispersed in a boehmite and the use of such a process is a preferred feature of this invention.

The process of the invention is particularly effective where the seed particles are dispersed in a sol of the precursor. For example the milling of a boehmite sol using alumina media produces a suitable dispersion which, when dried, may be used as the starting material in the process of the invention. Alternatively, finely dispersed seed particles in an aqueous medium may be thoroughly mixed with a boehmite sol-gel and the mixture dried to form a suitable seeded alpha alumina precursor for use in the present invention.

The invention further comprises a process for the production of alpha alumina from a seeded alpha alumina precursor which process comprises inducing a mechanochemical conversion of the seeded alpha alumina precursor to alpha alumina, by milling the seeded precursor in the substantial absence of water, in a milling device maintained at a temperature below 100° C. This material is found to have a significantly increased alpha alumina content and can later be heated to cause completion of the conversion to alpha alumina. This temperature of conversion is found to be surprisingly lower than if the same material had not been dry milled.

When the milled precursor is a seeded or unseeded boehmite this can be regelled, dried and then heated directly to give an alpha alumina powder of very fine particle size and an average crystallite size that is substantially below, for example as much as 40% or more, the crystallite size of powders produced without the milling operation. This process may be aided by the presence of known crystal growth limiters such as magnesia and other spinel forming oxides during the sintering. Such ultrafine crystal structures in shaped alpha alumina bodies such as ceramic monoliths, fibers and abrasive particles of all shapes, lead to excellent properties in the shaped product.

Such milled seeded boehmite powders also have the advantage that the gels made from them can be sintered to a product with at least 97% of the theoretical density, at temperatures that are at least about 50° C. below those required by gels made from powders that have not been milled.

Where the precursor product is gamma alumina, the milled product cannot of course be re-gelled. Such milled precursors, as well as unre-gelled milled boehmite, can be converted directly to alpha by heating at the reduced temperature described above. It is found however that, in these circumstances the reduction in crystallite size is not always in evidence.

While not wishing to be bound by any specific theory, the mechanochemical process is believed initially to induce structural changes in the lattice of the treated material to produce a conversion-predisposed product that, under the reaction conditions of this invention, undergoes at least partial conversion to the alpha form. Any form of mechanochemical operation that is capable of inducing such changes may be used. The results herein reported were obtained using a dry milling process in which physical impact of grinding media on the precursor crystal structure are believed to be responsible for the effect. However it is probable that any functional equivalent, such as for example a shock wave generated by any suitable mechanism, such as an explosion, might be used to produce the structural predisposition to conversion.

The alpha alumina precursor used is preferably boehmite. It is however to be noted that other precursors such as gamma alumina can be converted in the same way. If however a gamma alumina precursor is selected it should preferably be prepared from a seeded boehmite because of the difficulty of securing adequate dispersion of the seed material in dry gamma alumina. It is however found possible to mill unseeded gamma alumina to produce partial conversion to alpha alumina at room temperatures.

Where a milling operation is used to bring about the mechanochemical conversion, suitable devices include attrition or vibratory mills such as ball mills and planetary mills. Such mills use milling media to produce the grinding action and these are typically ground down themselves somewhat during the grinding operation. If the media are made from alpha alumina this can provide, or enhance the number of, seed particles present in the mixture remaining after grinding. There are however some negative factors that need to be considered. In the first place, unless very high purity media are used, impurities will be introduced from the media fragments left in the milled mixture. For a seed to be effective it needs to be of a material whose crystal structure is the same as alpha alumina and whose lattice parameters have a reasonably close match to those of alpha alumina. In addition the media fragment particle size will typically have a large variation and this may detract from the uniformity or sinterability of the crystal structure of the final product. It is known that some possible impurities can in fact be beneficial to the final product. For example, the presence of silica can slow crystal size growth during sintering, thus making the retention of a very fine microstructure easier to secure in the final product.

It is possible to use media such as tungsten carbide or zirconia but in general alpha alumina media are used since these have the necessary hardness and also contribute, through self-attrition, further amounts of seed material.

When milling, it is often desirable to add a small amount of a surfactant that will maintain the separation of the particles, minimize coating of the media and the mill with powder layers, and prevent clumping. Such a material is preferably one that is readily removed during the subsequent process steps to avoid contamination of the final product. Suitable surfactants include polyethylene glycols, fatty acids, isopropyl alcohol and the like.

The product obtained after the mechanochemical operation contains a significantly increased content of alpha alumina. The product from the mechanochemical operation contains any initially added seed material, balance of the precursor material which appears to be significantly conversion-predisposed and a significant amount of finely divided alpha alumina, which is often several times the weight of any initially added seed material. This latter quantity of alpha alumina is generated during the mechanochemical operation. It appears that the mechanochemical operation can actually bring about the conversion to alpha at room temperature and, in addition, make the conversion of the remaining precursor easier at elevated temperatures. While not wishing to be limited by any proposed mechanism to explain this effect, it is theorized that the mechanochemical treatment lowers the activation barrier between alpha and its precursor states such that a proportion of molecules possess sufficient energy to make the transition at any particular temperature. The balance of the precursor also is found to undergo the same conversion at a significantly lower temperature.

After the mechanochemical treatment, the product can then be heat treated to complete the conversion to alpha. This will now occur at a temperature that is significantly lower than that which is needed in the absence of such a treatment. Typically the conversion temperature, as indicated by differential thermal analysis, is reduced over that of the precursor, (seeded or unseeded), by at least 30° C., such as by about 50° C., and often more. The product is obtained in the form of a fine powder that is well adapted to a wide range of ceramic applications.

Where boehmite is a readily available starting material of an adequate purity level, it is sometimes preferred to subject such material to a prior heat treatment, for example at about 800° C., to bring about its conversion to the gamma form before initiating the mechanochemical treatment. This can be done before or, more preferably, after addition of any alpha conversion-promoting seed material. This heat treatment can however be dispensed with and the dry milling operation performed on the seeded or unseeded boehmite directly.

Whatever the precursor material used, it is preferred that it have a microcrystalline structure with the crystals having a cross-section, (measured by the average intercept method described below), as low as possible and preferably below about 0.1 micron.

In general any alpha alumina particles used as seed should have a particle size that is somewhat smaller than the fired crystallite size. This is because a seed particle can be expected to increase in diameter by up to about ten times during the phase conversion of the precursor. As the alpha alumina, for most applications, desirably has the lowest possible crystal size, it is likewise preferred to keep the seed size as low as can practically be achieved.

In the event it is desired to produce the alpha alumina in the form of abrasive particles or other shaped form, it may be preferred to form a sol from the product obtained after the mechanochemical treatment and then gel it and form it in the manner described in the prior art such as for example: U.S. Pat. Nos. 4,623,364; 4,744,802; and U.S. application Ser.

No. 07/345,139 filed Apr. 28, 1989. Such products will have the advantages of converting to the alpha form at a lower temperature and retaining a very fine crystal structure after substantially complete densification.

DRAWINGS

DESCRIPTION OF PREFERRED EMBODIMENTS

Figure 1A:
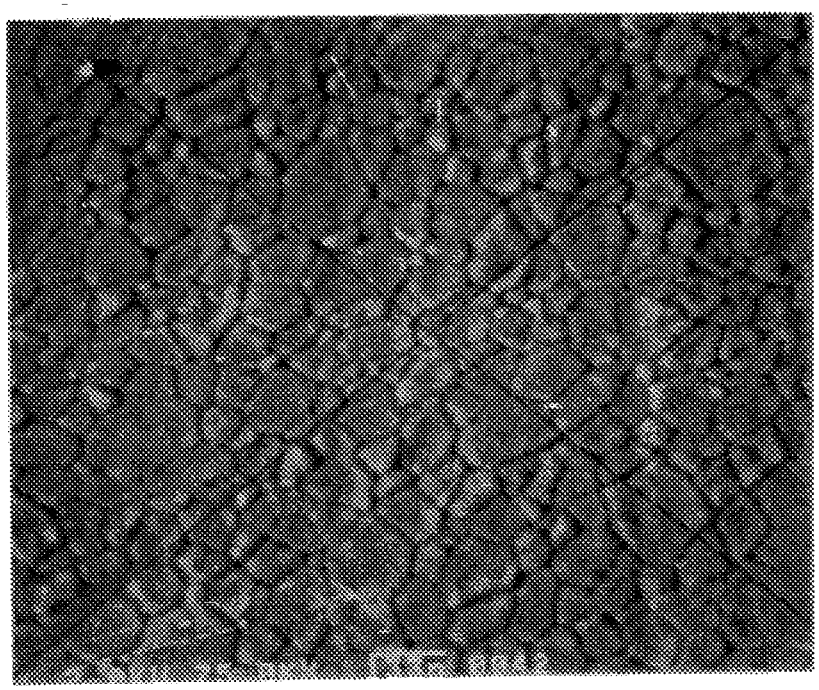
FIG. 1a is a scanning electron micrograph with a magnification of 75,000 of the thermally etched and polished surface of a product made according to the invention.

The invention is now described in further detail in the context of the following Examples which are intended for the purposes of illustration only and should not be taken as implying any necessary limitation on the essential scope of the invention.

Experimental Techniques

The following explanations pertain to the various experimental procedures and measurement methods used in this specification.

Seeding Sol-Gel

Seed is introduced in a boehmite sol by adding water that has been milled using alpha alumina media so as to produce a dispersion of fine alpha alumina particles, into the boehmite sol along with a nitric acid solution to cause gelation of the sol. The mixture is milled to bring about complete dispersion of the seed material in the boehmite.

Grain Size Measurement

The average size of the crystallites is measured by drawing a line across a photomicrograph of a cross-section of a grain and averaging the measured length of the line within each crystallite.

Differential Thermal Analysis (or DTA)

This was conducted using an "Omnitherm" machine and a heat-up rate of 20° C./minute and a nitrogen atmosphere.

Hardness

This was measured experimentally using a Vickers Indenter with a 500 gm. load on a polished surface of a fired grain.

EXAMPLE 1

This Example compares the amount of alpha alumina present in a sample of an alpha seeded gamma alumina powder after it has received a mechanochemical treatment according to the invention, with the amount of alpha alumina found in the product obtained by subjecting the same gamma alumina powder without the alpha seed to the same mechanochemical process.

Ten grams of gamma alumina obtained by heating Condea boehmite at 800° C. for 18 hours, was dry planetary milled for 6 hours at ambient temperature conditions using zirconia media. No alpha phase was detected in the product before the milling. After completion of the milling the alumina was found to contain 2.8% by weight of alpha alumina, as determined using X-ray diffraction crystallography.

A similar amount of the gamma alumina, this time containing 1.6 wt. % of alpha alumina powder as seed material was made by forming a gel of Condea Dispural boehmite, dispersing the alpha alumina seed material in it, and then drying the seeded boehmite and then heating at 800° C. for 18 hours. This mixture was then subjected to the same mechanochemical process as is described above. Upon analysis using the same techniques it was found that the alpha alumina content was 13.7 wt. %. As can be seen, if the amount of alpha phase present as a result of seed addition plus milling were to be purely additive, the total expected amount would be (1.6+2.8=) 4.4 wt. %. These data therefore show a very substantial synergistic effect as a result of milling the seeded material is at work.

EXAMPLE 2

In the following series of tests, a gamma alumina obtained by heating boehmite at 800° C. for 18 hours was subjected to various milling operations. In one of the tests, the boehmite used to obtain the gamma contained 1.5 weight percent of alpha alumina seeds and was obtained as described in Example 1. The differential thermal analysis, (DTA), of the unseeded gamma phase alone showed a phase transition temperature of 1230° C.

A. Unseeded gamma alumina, (100 gm.), was milled at ambient temperature conditions in a zirconia lined planetary mill for 6 hours using zirconia media. After milling, DTA peaks corresponding to the conversion of gamma to alpha were found at 1126° C. and 1183° C.

B. Seeded gamma alumina, (100 gm. with 1.5 wt % seed)), obtained by a seeded sol-gel route as indicated above from seeded boehmite, had a phase transition temperature by DTA of 1152° C. This was dry milled for 6 hours at ambient temperature conditions in a zirconia container with zirconia media, using a planetary mill. After milling DTA revealed that the alpha transition temperatures were 1037° C. and 1118° C.

The milling clearly increases the amount of seed material available and importantly appears to result in seeding that is more efficient in producing very fine crystals of alpha alumina.

It is clear that the reduction of the temperature of the transformation from gamma alumina to alpha obtainable by milling seeded material is very significant. By reducing the transition temperature less energy is needed to bring about the change and the use of less expensive materials becomes possible.

EXAMPLE 3

100 Grams of a seeded boehmite containing 1.5 wt. % alpha alumina seeds were dry milled for 48 hours in a laboratory Sweco mill, (Model #M18-5), at ambient temperature conditions, along with 1 g of an anti-caking agent, (Pluracol-E-400-NF, obtainable from BASF Corporation), using 1000 g of half inch diameter "Diamonite" alpha alumina media, (available from US Stoneware Corp.). Twenty grams of the milled powder were rolled with 180 g of deionized water in a plastic bottle using the alumina media. This was then gelled by addition of a mixture of 1.2 g of 70% nitric acid and 4 g of deionized water. The gel was sedimented overnight and then dried at 80° C., followed by further drying at 125° C. for one hour. The DTA peak for transformation to the alpha phase of this dried gel was at 1112° C. The dried gel was fired at 1200° C. for one hour and was found to have a density of 3.88 g/cc, a hardness of 21.2 GPa, and an average microcrystalline size, (by the intercept method), of 0.13 micron.

EXAMPLE 4

A seeded sol-gel boehmite, (with 1.5 wt % alpha alumina seed), such as was used in Example 2, (10 gm), was calcined at 800° C. for 18 hours. The resulting product still contained about 1.5% of alpha alumina, the remainder being transitional aluminas. This was then dry milled in a Pritchard mill at ambient temperature conditions using tungsten carbide media for 30 minutes. The dry milled powder was found to contain 5 wt % of alpha alumina.

When the same calcined seeded sol-gel boehmite was milled For one hour at ambient temperature conditions in a planetary mill in which the mill and the media were made of zirconia, the resulting dry milled powder was found to contain 12% of the alpha phase, (measured by X-ray diffraction techniques).

EXAMPLE 5

Five pounds of a seeded boehmite containing 1.5 wt. % of alpha alumina seeds was dry milled at ambient temperatures for 72 hours in a Sweco mill, (model M-18, rubber lined), using 50 lbs of half inch diameter "Diamonite" alumina media (from U.S. Stoneware Corp.). After milling, 40 gm. of the milled powder were mixed with 160 gm. of deionized water for 5 minutes and the mixture was gelled by addition of 2.4 gm. of 70% nitric acid and 7.2 gm. of deionized water. The gel was dried at 80° C. followed by one hour at 125° C. The DTA alpha transformation temperature of this gel was 1112° C. The gel sintered to a density of 3.87 gm/cc and a hardness of 20.3 GPa.

By contrast a seeded gel sample treated in exactly the same way except for the omission of the dry milling step had an alpha transformation peak at 1150° C. and had open porosity when fired at 1175° C. for one hour. It seems clear then that the milling has a significant effect on the alpha transformation.

EXAMPLE 6

The Sweco mill described in Example 5 was charged with 100 gm. of a seeded boehmite containing 5 wt % of alpha alumina seed and 0.4 wt % of magnesium nitrate hexahydrate, and one gram of Pluracol-E-400-NF, (an anti-caking additive available from BASF Co.). The mixture was then dry-milled at ambient conditions for 48 hours. The milled powder was mixed with 900 gm. of deionized water and then gelled by addition of 12 gm. of 70% nitric acid and 40 gm. of deionized water. The gel was sedimented overnight and then dried at 80° C. followed by an hour at 125° C. The dried gel had a DTA peak for transformation to alpha alumina at 1018° C. and sintered to a producy with a density of 3.82 gm/cc, a hardness of 20.8 GPa, and an average crystal size of 0.08 micron when fired at 1150° C. for one hour.

Figure 1B:
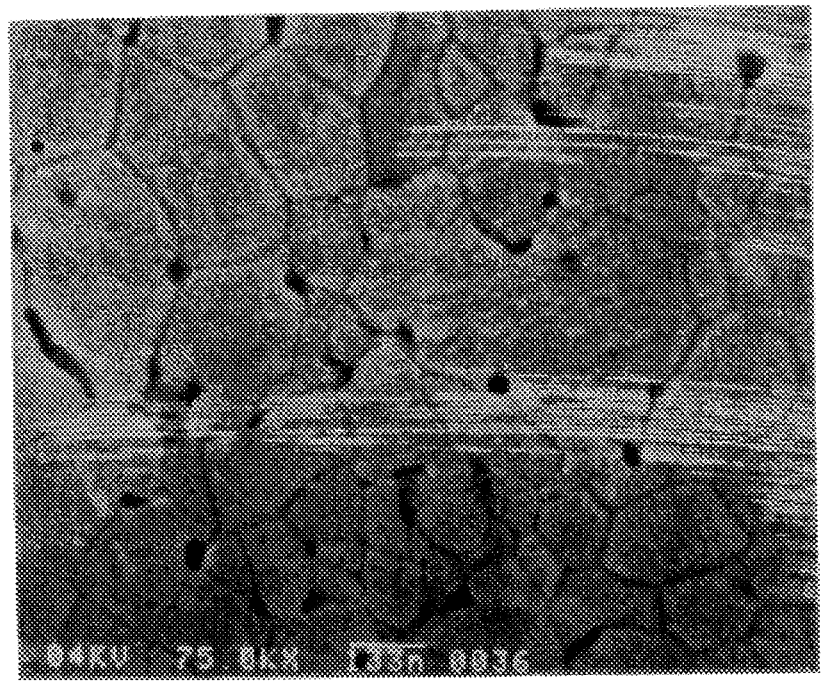
FIG. 1b is a similar micrograph of a product made according to a prior art process that did not include a dry-milling step.

By contrast a gel sample prepared exactly as above except for the omission of the dry milling had a DTA alpha transformation temperature of 1030° C. and had open porosity when fired under the same conditions. When fired at 1250° C. for an hour the product had a density of 3.84 g/cc, a hardness of 18.6 GPa and an average crystal size of 0.19 micron. FIGS. 1a and 1b show scanning electron micrographs of the above products; 1a showing the microfine crystal structure of the product made by the milling process of the invention and 1b showing the product made by a more conventional non-dry milled process.

It is clear then that this process permits the production of alpha alumina with an average crystal size that is about 25% smaller than is available using conventional techniques.

EXAMPLE 7

A series of experiments was performed on unseeded Condea Dispural boehmite. A first sample of 10 gm. was first milled in a planetary mill for about one hour. This directly produced 8% conversion to alpha alumina. Heating this powder at 875° C. for 10 hours produced a product having 25 wt % alpha alumina as measured by X-ray diffraction. In the absence of milling, heating under such conditions would produce essentially no alpha alumina. A transmission electron microscope study revealed a uniform dispersion of 0.1 micron alpha alumina particles spaced about 0.2 microns apart.

The calcined powder was cold isostatically pressed into a pill at 30,000 psi and fired at 1300° C. for ten minutes. The final product had a density that was 98% of theoretical. The final product had an equiaxed microcrystalline structure with a crystal size of about 0.2 micron. Without the milling the same process would yield a porous vermicular structure.

What is claimed is:

1. A process for at least partially converting gamma alumina to alpha alumina, in the presence of seed particles effective to promote conversion of the gamma alumina to alpha alumina, which process comprises subjecting gamma alumina having at least about 0.1% by weight of alpha alumina uniformly dispersed therein by a sol-gel seeding process, to a mechanochemical treatment sufficient to convert at least part of the gamma alumina to alpha alumina in the substantial absence of water at a temperature below about 100° C.

2. A process for the production of a shaped alpha alumina product by subjecting a dry mixture comprising gamma alumina having at least about 0.1% by wt. of a microcrystalline alpha alumina uniformly dispersed therein by a sol-gel seeding process, at a temperature below about 100° C., to a mechanochemical treatment sufficient to convert at least a part of the gamma alumina to alpha alumina and to reduce the temperature of conversion of the mixture to alpha alumina by at least 30° C., and thereafter shaping the mixture into the desired configuration and then heating to convert the shaped mixture to alpha alumina.

3. A process according to claim 2 in which the mechanochemical treatment comprises dry milling for a time sufficient to convert at least about 5 wt. % of the gamma alumina to alpha alumina.

4. A process for producing powdered alpha alumina which comprises subjecting gamma alumina having uniformly dispersed therein by a sol-gel process, at least about 0.1% by weight of microcrystalline alpha alumina, to a mechanochemical treatment at a temperature below about 100° C. under time and intensity conditions effective to induce a conversion of at least about 5 weight % of the gamma alumina to alpha alumina, and thereafter heating the treated mixture to a temperature sufficient to complete the conversion of the gamma alumina to alpha alumina.

5. A process according to claim 4 in which the mechanochemical treatment is carried out at a temperature from about 10° C. to about 50° C.

* * * * *